United States Patent [19]

Nakatsuka et al.

[11] 4,349,349

[45] * Sep. 14, 1982

[54] AQUEOUS LIQUID COMPOSITION OF REACTIVE DYE

[75] Inventors: Kiyoharu Nakatsuka; Sadaharu Abeta, both of Toyonaka, Japan

[73] Assignee: Sumitomo Chemical Company, Limited, Osaka, Japan

[*] Notice: The portion of the term of this patent subsequent to Aug. 11, 1998, has been disclaimed.

[21] Appl. No.: 246,858

[22] Filed: Mar. 23, 1981

[30] Foreign Application Priority Data

Mar. 31, 1980 [JP] Japan .................................. 55/42411

[51] Int. Cl.$^3$ ............................................. D06P 67/00
[52] U.S. Cl. ........................................ 8/527; 8/549; 8/589; 8/676; 8/907; 8/918
[58] Field of Search .................... 8/527, 549, 589, 676

[56] References Cited

U.S. PATENT DOCUMENTS 4,072,463  2/1978  Schlafer et al. ..................... 8/527
4,283,195  8/1981  Nakatsuka et al. .................. 8/524

Primary Examiner—A. Lionel Clingman
Attorney, Agent, or Firm—Stevens, Davis, Miller & Mosher

[57] ABSTRACT

An aqueous liquid dye composition containing 10 to 50 parts by weight of C.I. Reactive Blue 19, 1 to 40 parts by weight of a condensation product of formaldehyde with naphthalenesulfonic acid which may be alkylated, 0.1 to 10 parts by weight of a nonionic surfactant having an HLB of 9 to 20, and 20 to 80 parts by weight of water. This liquid dye composition has a good storage stability, and shows a sufficient solubility in an aqueous alkali liquor so that it is particularly suitable for dyeing cellulosic fibers by a one-bath pad-batch method.

8 Claims, No Drawings

AQUEOUS LIQUID COMPOSITION OF REACTIVE DYE

The present invention relates to an aqueous liquid composition of C.I. Reactive Blue 19, which is good in storage stability and compatibility with alkali liquors.

Dyeing of natural or regenerated cellulosic fibers with reactive dyes such as C.I. Reactive Blue 19 has been carried out by, for example, an exhaustion method using a dyeing bath of 50° to 60° C., a padding method which comprises uniformly padding the fibers with a dye liquor, drying, alkali padding and fixing by steaming at 100° to 150° C., and the like. Either of these methods requires considerable quantities of thermal energy. While, because of recent marked decrease in oil resources and rise in oil cost, the dyeing industry also has been obliged to take up saving in energy as the most serious problem to be solved. And also, in dyeing cellulosic fibers with reactive dyes, a one-bath pad-batch method requiring no thermal energy at all is finding markedly increasing uses. For carrying out this method, however, a dye to be used or an aqueous liquid composition containing the dye need to have a sufficient solubility in aqueous alkali liquor which are necessary to fix the dye. For example, 200 parts by weight of the aqueous liquid composition having a dye content of at least 10% by weight should be soluble in 1,000 parts by weight of an aqueous solution containing an electrolyte and one of sodium hydroxide, sodium carbonate and trisodium phosphate, or an aqueous solution containing a mixture of sodium silicate and sodium hydroxide.

An aqueous liquid composition of C.I. Reactive Blue 19 obtained by a known method produce precipitates 2 to 3 minutes after the mixing with the aqueous alkali liquor, so that uniform padding on cellulosic fibers can not be achieved, thereby causing unlevel dyeing and marked lowering in color yield.

Published unexamined Japanese Patent Application No. 136314/1975 discloses aqueous liquid compositions of reactive dyes, containing 5 to 35% by weight of a dye having both sulfonic acid and reactive groups and 1 to 5% by weight of a buffer agent and having a pH of 3 to 7. In this manner, an aqueous liquid composition of C.I. Reactive Blue 19, having a storage stability improved to some extent can be obtained. But, this composition produces precipitates 2 to 3 minutes after having been allowed to mix with the alkali liquor and therefore uniform application of the dye to cellulosic fibers is difficult. Further, it was found that the color yield also was extremely lowered.

There is another method for producing the aqueous liquid composition of C.I. Reactive Blue 19 in which a condensation product of formaldehyde with naphthalenesulfonic acid or alkylnaphthalenesulfonic acid is added to the dye in order to improve the solubility of the dye in aqueous alkali liquors. In this manner, however, excepting a case where the aqueous liquid composition obtained is contaminated with a very small amount of inorganic salts, the resulting liquid composition readily produces dye precipitates during storage for 7 to 10 days, and is subject to gelation and loss of fluidity, so that the composition becomes very hard to be taken out of a container.

The present inventors have extensively studied to find an aqueous liquid composition of C.I. Reactive Blue 19, which is advantageously usable for the one-bath pad-batch method without precipitation of the dye when mixed with the alkali, capable of dyeing cellulosic fibers uniformly with high color yields, and besides good in storage stability even when contaminated with considerably large amounts of inorganic salts coming from production steps, and found that a particular liquid dye composition satisfies those requirements.

The present invention provides an aqueous liquid dye composition containing 10 to 50 parts by weight of C.I. Reactive Blue 19, 1 to 40 parts by weight of a condensation product of formaldehyde with naphthalenesulfonic acid which may be alkylated, 0.1 to 10 parts by weight of a nonionic surfactant having an HLB of 9 to 20, and 20 to 80 parts by weight of water, a method for producing a liquid dye composition having a good storage stability, which comprises dissolving 10 to 50 parts by weight of C.I. Reactive BLue 19, in 20 to 80 parts by weight of water, together with 1 to 40 parts by weight of a condensation product of formaldehyde with naphthalenesulfonic acid which may be alkylated, and 0.1 to 10 parts by weight of a nonionic surfactant having an HLB of 9 to 20, and also a method for storage of C.I. Reactive Blue 19 in an aqueous liquid, which comprises dissolving 10 to 50 parts by weight of C.I. Reactive Blue 19 in 20 to 80 parts by weight of water together with 1 to 40 parts by weight of a condensation product of formaldehyde with naphthalenesulfonic acid which may be alkylated, and 0.1 to 10 parts by weight of a nonionic surfactant having an HLB of 9 to 20. The dye composition according to the present invention contains 10 to 50 parts by weight, preferably 20 to 40 parts by weight, of C.I. Reactive Blue 19, 1 to 40 parts by weight, preferably 10 to 20 parts by weight, of a condensation product of formaldehyde with naphthalenesulfonic acid which may be alkylated, 0.1 to 10 parts by weight, preferably 0.5 to 5 parts by weight, of a nonionic surfactant having an HLB of 9 to 20 and 20 to 80 parts by weight, preferably 30 to 70 parts by weight, of water.

In the present invention, C.I. Reactive Blue 19 referred herein is a dye containing as a main component a compound represented by a free acid of the following formula, impurities and inorganic salts:

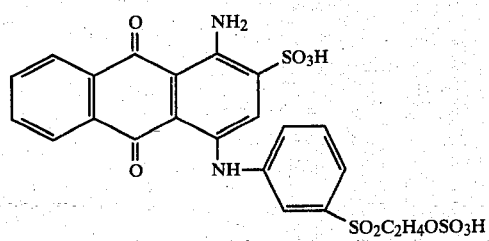

C.I. Reactive Blue 19 may be obtained by a usual method, and may be of any form, such as dry cake, reaction solution itself, concentrated product of the reaction solution and wet cake before drying. The content of said compound in the dye is generally within a range of 10 to 90% by weight.

The condensation product of formaldehyde with naphthalenesulfonic acid which may be alkylated can be produced by a method known by the skilled in the art. The naphthalenesulfonic acid which may be alkylated includes for example naphthalenesulfonic acid, methylnaphthalenesulfonic acid, ethylnaphthalenesulfonic acid, propylnaphthalenesulfonic acid and butylnaphthalenesulfonic acid. In the condensation with formaldehyde, one or more naphthalenesulfonic acids described above are employed. A sulfonation degree of said naphthalenesulfonic acid is preferably 50 to 150% on the average (100% of the sulfonation degree means that one sulfonic acid group is attached to one naphthalene nucleus).

The condensation product of formaldehyde with the naphthalenesulfonic acid may have an average condensation degree of 1.1 to 6.0, and may be used as alkali metal salts.

The nonionic surfactant usable in the present invention includes for example alkylphenyl ethers of polyhydric alcohols represented by the formula,

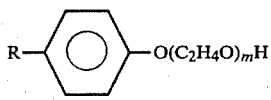

wherein R is a straight or branched $C_6$–$C_{15}$ alkyl group and m is a number of 5 to 50, alkyl ethers of polyhydric alcohols represented by the formula,

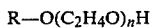

wherein R is as defined above, and n is a number of 1 to 50, fatty acid esters of polyhydric alcohols represented by the formula,

wherein R and n are as defined above, or by the formula,

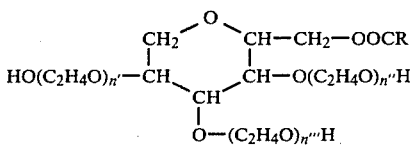

wherein R is as defined above, and n', n" and n''' are each a number of 1 to 50, and copolymers of ethylene oxide with propylene oxide represented by the formula,

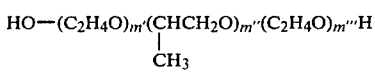

wherein m', m" and m''' are each a number of 5 to 30. These nonionic surfactants may be used each alone or in admixture of two or more. These nonionic surfactants can be produced according to a method known by the skilled in the art or a method equivalent thereto. These surfactants need to have an HLB of 9 to 20.

The dye composition according to the present invention may contain hydrotropic agents such as urea, anthraquinone-2-sulfonic acid, pyrrolidone or acid amides (e.g. caprolactam), buffer agents for pH stabilization, hard water-softening agents such as polyphosphates, and solvents such as polyhydric alcohols (e.g. diethylene glycol) or ethers of a polyhydric alcohol (e.g. butyl carbitol). Further, the dye composition may contain electrolytes (e.g. sodium chloride, sodium sulfate) in a small amount such that the solubility and storage stability of the present compositions are not adversely affected.

The liquid dye compositions of the present invention obtained have a good storage stability for a long period of time at a wide temperature range of −10° to 80° C., and show a sufficient solubility in aqueous alkali liquors on dyeing.

The liquid dye compositions of the present invention are usable for dyeing natural or regenerated cellulosic fibers in a conventional method such as exhaust dyeing, printing and pad dyeing. The present liquid dye compositions are particularly suitable for a one-batch pad-batch method. In this method, a padding liquor is prepared by dissolving pre-determined amounts of the present liquid dye composition and an alkali agent (e.g. sodium hydroxide, sodium carbonate, trisodium phosphate, sodium silicate) in water. A cellulosic fiber cloth to be dyed is padded with the padding liquor, batched up, allowed to stand, rinsed, soaped, rinsed again and dried. Thus, dyeings of high color yield having no unevenness can be obtained.

The present invention is illustrated in more detail with reference to the following examples, which are not however to be interpreted as limiting the invention thereto. All parts in the examples are by weight.

EXAMPLE 1

To 34 parts of a 74%-purity C.I. Reactive Blue 19 (sodium salt) containing 3.2% of sodium sulfate were added 16 parts of a formaldehyde/methylnaphthalenesulfonic acid condensation product (sodium salt), of which the sulfonation degree was 110% and the average condensation degree was 1.8, containing 4.3% of sodium sulfate, 1 part of polyethylene glycol alkylphenyl ether having an HLB of 11, 0.5 part of sodium acetate and 48.5 parts of water.

(1) This mixture was maintained at 50° C. for 60 minutes with stirring to completely dissolve the dye and the condensation product, and then allowed to cool to room temperature. The pH of the resulting solution was adjusted to 5.5 with a 5% aqueous sulfuric acid solution and a 10% aqueous sodium hydrogen carbonate solution to prepare a dye composition.

(2) 240 g of the freshly prepared dye composition was taken and diluted with water, and 15 ml of a 32.5 wt. % aqueous sodium hydroxide solution and 150 g of water glass having a specific gravity of 50° Bé were added thereto. The mixture was made up to 1 liter at 25° C. with water to prepare a padding liquor, and immediately thereafter, cotton fabrics were padded with this liquor. The padded cotton fabrics were hatched up, covered air-tight with polyethylene film and allowed to stand at 20° C. for 20 hours. Thereafter, the dyeings were rinsed with cold water and then with hot water, soaped in a boiling detergent, rinsed again with cold water and dried for finishing. Thus, dyeings of a very deep blue color having no unevenness could be obtained.

(3) The padding liquor prepared in (2) showed no dye precipitation at all even after allowed to stand at 25° C. for 90 minutes. Further, this padding liquor after standing produced very deep-depth, level dyeings having no unevenness by padding dyeing cotton fabrics in the same manner as in (2).

(4) The above dye composition was stored at 60° C. for 14 days, but it showed no change. Further, this composition after storage produced level dyeings having no unevenness by padding dyeing cotton fabrics in the same manner as in (2).

(5) The dye composition obtained in (1) was stored at 0° C. for 14 days, but it showed no precipitation of the dye and inorganic salts. Further, this composition after storage produced level dyeings having no unevenness by padding dyeing cotton fabrics in the same manner as in (2).

EXAMPLE 2

To 34 parts of a 74%-purity C.I. Reactive Blue 19 (sodium salt) containing 3.2% of sodium sulfate were added 15 parts of a formaldehyde/ethylnaphthalenesulfonic acid condensation product (sodium salt), of which the sulfonation degree was 100% and the average condensation degree was 2.5, containing 5.5% of sodium sulfate, 5 parts of polyoxyethylene alkyl ether having an HLB of 18, 1 part of diethylene glycol monobutyl ether and 45 parts of water.

(1) A dye composition was prepared in the same manner as in (1) of Example 1 using this mixture.

(2) A padding liquor was prepared in the same manner as in (2) of Example 1 using 240 g of the freshly prepared dye composition. Immediately thereafter, cotton fabrics were padding dyed with this padding liquor to obtain level dyeings having no unevenness.

(3) The padding liquor prepared in (2) was allowed to stand at 25° C. for 90 minutes, but dye precipitation was not observed at all. This padding liquor after standing produced level dyeings having no unevenness by padding dyeing cotton fabrics.

(4) The above dye composition was stored at 60° C. for 14 days, but it showed no change. This composition after storage produced level dyeings having no unevenness by padding dyeing cotton fabrics in the same manner as in (2).

(5) The dye composition obtained in (1) was stored at 0° C. for 14 days, but it showed no change. This composition after storage produced level dyeings having no unevenness by padding dyeing cotton fabrics in the same manner as in (2).

EXAMPLE 3

To 34 parts of a 74%-purity C.I. Reactive Blue 19 (sodium salt) containing 3.2% of sodium sulfate were added 15 parts of a formaldehyde/naphthalenesulfonic acid condensation product (sodium salt), of which the sulfonation degree was 100% and the average condensation degree was 3.5, containing 3.9% of sodium sulfate, 1 part of polyethylene glycol polypropylene glycol ether having an HLB of 14 and 50 parts of water.

(1) A dye composition was prepared in the same manner as in (1) of Example 1 using this mixture.

(2) A padding liquor was prepared in the same manner as in (2) of Example 1 using 240 g of the freshly prepared dye composition. Immediately thereafter, cotton fabrics were padding dyed with this padding liquor to obtain level dyeings having no unevenness.

(3) The padding liquor prepared in (2) was allowed to stand at 25° C. for 30 minutes, but dye precipitation was not observed at all. This padding liqour after standing produced level dyeings having no unevenness by padding dyeing cotton fabrics.

(4) The above dye composition was stored at 60° C. for 7 days, but it showed no change. This composition after storage produced level dyeings having no unevenness by padding dyeing cotton fabrics in the same manner as in (2).

(5) The dye composition obtained in (1) was stored at 0° C. for 14 days, but it showed no change. This composition after storage produced level dyeings having no unevenness by padding dyeing cotton fabrics in the same manner as in (2).

EXAMPLE 4

To 72.3 parts of a concentrated aqueous solution of C.I. Reactive Blue 19 (content of solid matter in the solution, 47%; content of C.I. Reactive Blue 19 in the solid matter, 74%; content of sodium sulfate, 3.2%), as obtained from the production step, were added 20 parts of a 40% aqueous solution, as obtained from the usual production step, of a formaldehyde/methylnaphthalenesulfonic acid condensation product (sodium salt), of which the sulfonation degree was 110%, the average condensation degree was 1.6 and the sodium sulfate content was 4.3%, 0.5 part of polypropylene glycol polyethylene glycol ether having an HLB of 19 and 7.2 parts of water.

(1) This mixture was thoroughly mixed by stirring at room temperature for 20 minutes, and the pH of the resulting solution was adjusted to 5.5 with a 5% aqueous sulfuric acid solution and a 10% aqueous sodium hydogen carbonate solution to prepare a dye composition.

(2) A padding liquor was prepared in the same manner as in (2) of Example 1 using 240 g of the freshly prepared dye composition. Immediately thereafter, cotton fabrics were padding dyed with this padding liquor to obtain level dyeings having no unevenness.

(3) The padding liquor prepared in (2) was allowed to stand at 25° C. for 90 minutes, but dye precipitation was not observed at all. This padding liquor after standing produced level dyeings having no unevenness by padding dyeing cotton fabrics.

(4) The above dye composition was stored at 60° C. for 14 days, but it showed no change. This composition after storage produced level dyeings having no unevenness by padding dyeing cotton fabrics in the same manner as in (2).

(5) The dye composition obtained in (1) was stored at 0° C. for 14 days, but it showed no change. This composition after storage produced level dyeings having no unevenness by padding dyeing cotton fabrics in the same manner as in (2).

COMPARATIVE EXAMPLE 1

To 34 parts of a 74%-purity C.I. Reactive Blue 19 (sodium salt) containing 3.2% of sodium sulfate were added 16 parts of a formaldehyde/methylnaphthalenesulfonic acid condensation product (sodium salt), of which the sulfonation degree was 110%, and the average condensation degree was 1.8, containing 4.3% of sodium sulfate, and 49 parts of water.

(1) A dye composition was prepared in the same manner as in (1) of Example 1 using this mixture.

(2) A padding liquor was prepared in the same manner as in (2) of Example 1 using 240 g of the freshly prepared dye composition. Immediately thereafter, cotton fabrics were padding dyed with this padding liquor to obtain level dyeings having no unevenness.

(3) The padding liquor prepared in (2) was allowed to stand at 25° C. for 90 minutes, but dye precipitation was not observed at all. This padding liquor after standing produced level dyeings having no unevenness by padding dyeing cotton fabrics.

(4) The above dye composition was stored at 60° C. for 7 days, but it showed no change. This composition after storage produced level dyeings having no unevenness by padding dyeing cotton fabrics in the same manner as in (2).

(5) On storing the dye composition obtained in (1) at 0° C. for 4 days, it was found that the dye deposited out of the composition, and at the same time that the whole composition changed into gel and lost fluidity almost completely, being in such a state that it was no longer applicable to practical use.

(6) On storing the dye composition obtained in (1) at 18° to 25° C. for 4 days in a room, it was found that dye deposited out of the composition, and at the same time that the whole composition changed into gel and lost fluidity almost completely, being in such a state that it was no longer applicable to practical use.

What is claimed is:

1. An aqueous liquid dye composition containing 10 to 50 parts by weight of C.I. Reactive Blue 19, 1 to 40 parts by weight of a condensation product of formaldehyde with naphthalenesulfonic acid which may be alkylated, 0.1 to 10 parts by weight of a nonionic surfactant having an HLB of 9 to 20, and 20 to 80 parts by weight of water.

2. The composition according to claim 1, wherein the condensation product is one member selected from condensation products of formaldehyde with at least one of naphthalenesulfonic acid, methylnaphthalenesulfonic acid, ethylnaphthalenesulfonic acid, propylnaphthalenesulfonic acid and butylnaphthalenesulfonic acid.

3. The composition according to claim 1, wherein the sulfonation degree of the naphthalenesulfonic acid is 50 to 150%.

4. The composition according to claim 1, wherein the condensation product has an average condensation degree of 1.1 to 6.0.

5. The composition according to claim 1, wherein the nonionic surfactant is at least one member selected from alkylphenyl ethers of polyhydric alcohols, alkyl ethers of polyhydric alcohols, fatty acid esters of polyhydric alcohols, copolymers of ethylene oxide and propylene oxide.

6. A method for producing an aqueous liquid dye composition having a good storage stability, which comprises dissolving 10 to 50 parts by weight of C.I. Reactive Blue 19 in 20 to 80 parts by weight of water together with 1 to 40 parts by weight of a condensation product of formaldehyde with naphthalenesulfonic acid which may be alkylated, and 0.1 to 10 parts by weight of a nonionic sulfactant having an HLB of 9 to 20.

7. A method for storage of C.I. Reactive Blue 19 in an aqueous liquid, which comprises dissolving 10 to 50 parts by weight of C.I. Reactive Blue 19 in 20 to 80 parts by weight of water together with 1 to 40 parts by weight of a condensation product of formaldehyde with naphthalenesulfonic acid which may be alkylated, and 0.1 to 10 parts by weight of a nonionic surfactant having an HLB of 9 to 20.

8. A method for dyeing cellulose fibers, which comprises using an aqueous liquid dye composition containing 10 to 50 parts by weight of C.I. Reactive Blue 19, 1 to 40 parts by weight of condensation product of formaldehyde with naphthalenesulfonic acid which may be alkylated, 0.1 to 10 parts by weight of a nonionic surfactant having an HLB of 9 to 20, and 20 to 80 parts by weight of water.

* * * * *